April 14, 1936.  R. J. RUTHS  2,037,048

COUPLING

Filed Feb. 27, 1935

INVENTOR.
ROBERT J. RUTHS.
BY John J. Fitzgerald
ATTORNEYS.

UNITED STATES PATENT OFFICE 2,037,048

COUPLING

Robert J. Ruths, Baltimore, Md.

Application February 27, 1935, Serial No. 8,571

4 Claims. (Cl. 64—14)

(Granted under the act of March 3, 1883, as amended April 30, 1928; 370 O. G. 757)

This invention relates to a coupling means for connecting two rotating elements on the same axis together and has for an object to provide an improved coupling especially intended for use in propeller shafting of a ship, and more especially a submarine, although capable of use in many other types of power transmitting shafting.

When installing propeller shafting in a vessel it is practically impossible to place the shaft in exact alignment and, if properly aligned, it is impossible to maintain the shaft in perfect alignment. As the shaft rotates the propeller at the end thereof travels through the water which has various degrees of motion; the water through which the lower portion of the propeller is passing being in a different state of motion than the water through which the upper portion is passing. As a result of this and other factors, the shaft is continually undergoing different torsional stresses, tending to twist the shaft and throw it out of alignment and causing vibration and noise. This difficulty is increased whenever the rotating shaft is being either accelerated or decelerated. The undesirability of the vibration and the noise necessarily set up by a rotating propeller shaft in a confined space as a submarine is obvious.

This invention provides a coupling to be placed somewhere in the line of the shaft so that there will be a non-metallic contact between the sections of the shaft. This non-metallic contact will preferably include rubber, either natural or artificial, as a contact medium and this contact medium acts as a cushioning element, reducing the vibration and eliminating the noises otherwise transmitted by the shaft from the propeller end to the power end.

The insulating medium further serves to provide for correction of any slight misalignments of the shaft such as are caused by initial physical error or by settling of the foundations, etc.

With the foregoing and other objects in view, this invention, as will hereinafter become apparent, comprises a combination and construction hereinafter disclosed, claimed, and illustrated on the drawing, wherein, Figure 1 is a sectional view through a coupling of this invention taken on line 1—1 of Figure 2;

Figure 1:
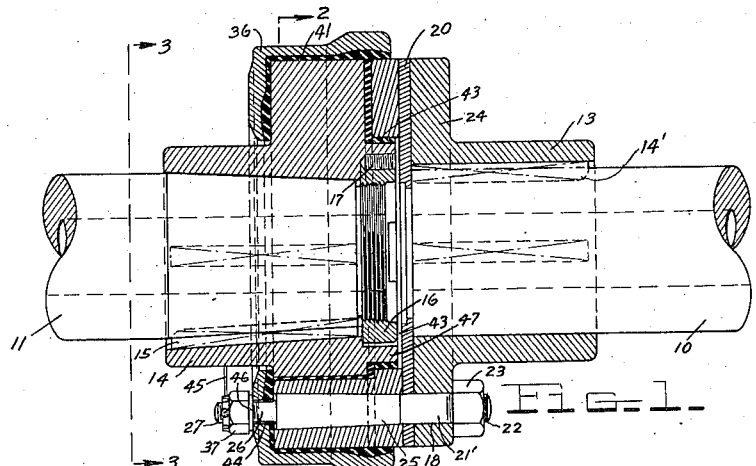

There is shown at 10 a power or driving portion of a propeller shaft and at 11 a driver or propeller portion of the shaft to which has been applied the coupling 12 constituting this invention for the purpose of reducing vibration and noise and for correcting unavoidable misalignments of the propeller shaft arising from any cause whatsoever whether in motion or at rest. A coupling sleeve 13 is keyed as at 14' to the driving shaft section 10 in the usual manner while another coupling 14 is similarly keyed as at 15 to the driver shaft section 11. The sleeve 14 is positively held on the shaft section 11 by means of a nut 16 and a set screw 17 threaded on to the shaft section 11.

Secured to the sleeve 13 by means of a plurality of bolts 18 is the driving member 19, a washer 20 being interposed between the driving member 19 and the sleeve 13. Formed on the driving member 19 are a plurality of lugs 21 shaped as shown. The stud bolts 18 are each provided with a cylindrical section 21' threaded at the end 22 to receive a nut 23 for holding them in place through flange 24 of the sleeve 13. At the other end of the cylindrical section, the nut 18 tapers outwardly as at 25 and is provided with a reduced threaded neck 26.

Extending through each of the lugs 21 is a bolt hole which is cylindrical as at 28 and flares outwardly as at 29 in correspondence with the cylindrical section 21 and the tapered section 25 of the bolt 18. As will be apparent, this tapered section 25 therefore cooperates to hold the driving member 19 in position on the sleeve 13.

Figure 2:
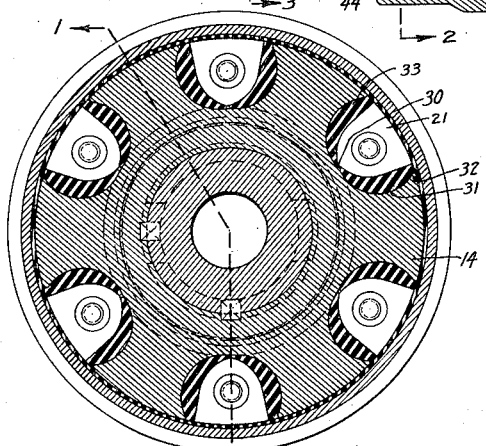
Figure 2 is a cross section through the coupling taken on line 2—2 of Figure 1.
Figure 3:
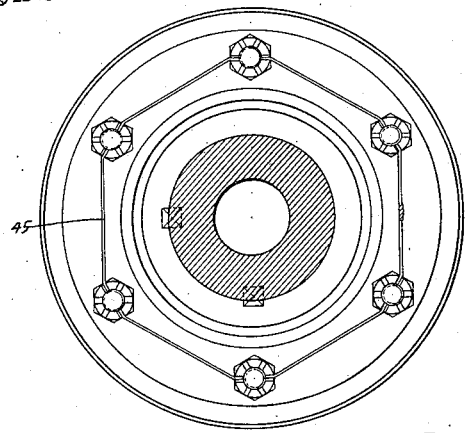
Figure 3 is an end view of the coupling taken on line 3—3 of Figure 1.
Figure 4:
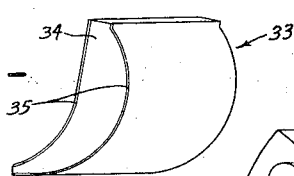
Figure 4 is an isometric view of a cushioning segment.
Figures 5, 6:
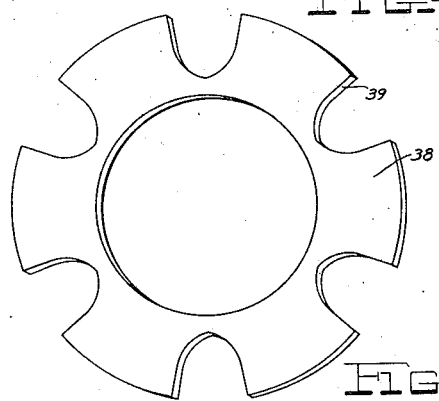
Figure 5 is an isometric view of a cushioning disk.
Figure 6 is an isometric view of the driving member.

As will be apparent from Figures 1 and 2, the sleeve 14 is provided with a plurality of recesses extending therethrough corresponding in number and position to the lugs 21. The walls of these recesses, when in cooperative assembly, are spaced from the walls of the lugs 21 a substantial distance. The walls of the recess and the walls of the lug 21 approach most closely at the apex 30. The recess walls then curve away with a substantial bulge as at 31 and then curve backwardly again toward the wall of the lug at its end 32. As will be observed, the space between the lug and the recess walls is the smallest at point 30, it is greatest at approximately point 31 and it is a mean distance at point 32. The space provided between the walls of the recess and the walls of the lug is filled by the cushioning segment 33, illustrated in Figure 4, one cushioning segment 33 being placed on each side of the apex 30. This cushioning segment 33 is shaped as shown corresponding to the space between the recess and lug walls but slightly over-size so that it may be compressed into this space when being assembled. This cushioning segment 33 is preferably made either of artificial or natural soft rubber 34. As will be observed, metal walls preferably of sheet copper 35 are vulcanized to opposite sides of the cushioning segment 33 but the metal walls 35 are not an essential part of the invention and may be omitted if desired.

The threaded neck 27 of bolt 18 extends through a metal cup 36 and has a holding nut 37 placed thereon to hold the cup 36 in assembled position. A rubber disk 38 provided with apertures 39 corresponding in shape and size with the lugs 21 is placed on the base 40 of the driving member 19 with the apertures 39 encompassing the base ends of the lugs 21. The disk 38 is of a somewhat harder degree of rubber than the cushioning segments 33 and is interposed between the base 40 of the driving member 19 and the end of sleeve 14.

Vulcanized to the inside of the metal cup 36 is a rubber cup 41 which is shaped preferably as shown in Figure 1. This rubber cup 41 is of a degree harder than the material of the rubber disk 38. The sleeve 14 ends in a flange 42 within which the nut 16 is placed and the external diameter of the flange 42 is substantially less than the internal diameter of the base 40 of the driving member 19 and the space thus provided is occupied by a rubber cylinder 43 which is of a degree harder than the material of the rubber cup 41.

It will be thus observed that the material of the various cushioning elements is of various degrees of hardness, the softest being the cushioning element 33, the next harder being the molded rubber disk 38, and the next harder being the vulcanized rubber cup 41 and the hardest being the rubber cylinder 43. As will be observed, these rubber parts 33, 36, 38, 41, and 43 serve to prevent any metal-to-metal contact between the shaft portions or coupling elements of the device. It is further observed that the threaded neck 26 of nut 18 extends through an aperture 44 in the cup 36 which is of a larger diameter than the diameter of the neck. Furthermore, the nut 37 is held in position thereon by means of a lock wire 45 which extends through the entire assembly of nuts. A washer 46 likewise preferably of rubber serves to prevent any possibility of metal contact between the nut 37 and the cup 36. The cup 36 is, of course, prevented from having any metal contact with the sleeve 14 as a result of its vulcanized rubber cup 41 and there is no possible metal-to-metal contact between shaft portion 11 and the shaft portion 10. It is, therefore, impossible for any vibration or noise to travel from one shaft to another.

In operation, as the power section 10 is operated, it transmits the force through the driving member 19 and the lugs 21. These lugs 21 tend to compress the segment 33, the segment 33 being of the softest material. These lugs 21 are semi-flowing, that is, as they compress the particular segment about each lug which is placed under compression they tend to flow slightly past the apex 30 and to a greater degree past the end 32. The other rubber parts, including the rubber cup 41 and the rubber disk 38 act as a dam to prevent the free flow of the rubber 34 of cushioning segment 33, the rubber cylinder 43 acting as a final dam to reinforce the rubber disk 38.

The rubber 34 of the cushion segment 33 is, therefore, prevented from escaping from the recess except in the most limited degree and hence serves to transmit the forces to the sleeve 14 and thence to the propeller portion of the shaft 11 without any metal-to-metal contact. In addition to transmitting the power, these rubber elements provide for slight misalignments between the power section 10 and the power section 11 of the shaft. They furthermore absorb any vibration and prevent any noise being transmitted from one end of the shaft to the other. The sheet copper walls 35 may be placed on the rubber 34 of the cushion 33 so as to reinforce it so much but may be omitted, if desired, without affecting the operation of the invention.

The invention herein described may be manufactured and used by or for the Government of the United States of America for governmental purposes without the payment of any royalty thereon or therefor.

Having thus described the invention, I claim:

1. A shaft coupling for two sections of shafting comprising a flanged sleeve member attached to one section of shafting, a second flanged sleeve member attached to the other section of shafting, a driving member secured to the flange of one of the said sleeve members, a plurality of lugs extending from said driving member, the flange of the other of the said sleeve members having a plurality of recesses corresponding in number and position with said plurality of lugs, said lugs being adapted to be assembled in cooperative relation to said recesses, said lugs being substantially smaller than said recesses whereby a substantial amount of space separates the walls of said lugs from the walls of said recesses, cushioning means occupying the space in said recesses between said recess walls and said lug walls, and a cushion lined cup encompassing said recessed flange; and securing means extending through said cup, through said lugs lying within said recesses of the one sleeve flange, and through the flange of the other sleeve member.

2. A shaft coupling for two sections of shafting comprising a flanged sleeve member attached to one section of shafting, a second flanged sleeve member attached to the other section of shafting, a driving member secured to the flange of one of the said sleeve members, a plurality of lugs extending from said driving member, the flange of the other of the said sleeve members having a plurality of recesses corresponding in number and position with said plurality of lugs, said lugs being adapted to be assembled in cooperative relation to said recesses, said lugs being substantially smaller than said recesses whereby a substantial amount of space separates the walls of said lugs from the walls of said recesses, cushioning means occupying the space in said recesses between said recess walls and said lug walls, a cushion lined cup encompassing said recessed flange; and securing means extending through said cup, through said lugs lying within said recesses of the one sleeve flange, and through the flange of the other sleeve member; the cushioning means in said recess spaces between said lugs and recess walls being a degree softer than the material of the cushion lining of the cup.

3. A shaft coupling for two sections of shafting comprising a flanged sleeve member attached to one section of shafting, a second flanged sleeve member attached to the other section of shafting, a driving member secured to the flange of one of the said sleeve members, a plurality of lugs extending from said driving member, the flange of the other of the said sleeve members having a plurality of recesses corresponding in number and position with said plurality of lugs, said lugs being adapted to be assembled in cooperative relation to said recesses, said lugs being substantially smaller than said recesses whereby a substantial amount of space separates the walls of said lugs from the walls of said recesses, cushioning means occupying the space in said recesses between said recess walls and said lug walls, and a cushion lined cup encompassing said recessed flange; and securing means extending through said cup, through said lugs lying within said recesses of the one sleeve flange, and through the flange of the other sleeve member; the cushioning member on said driving member about said lugs and between said driving member and said recessed flange, the material of said latter cushioning means being of a degree harder than the material of the cushion lining of the cup.

4. A shaft coupling as set forth in claim 3, having a cylindrical flange extending forwardly from the recessed flange sleeve into cooperative relation but spaced from the wall of an opening in the driving member, and a cylindrical cushioning member filling the space between the cylindrical flange and the wall of the driving member, the material of said cushioning means being of the hardest degree of the cushioning materials.

ROBERT J. RUTHS.